(12) United States Patent
Shen et al.

(10) Patent No.: US 12,014,284 B2
(45) Date of Patent: Jun. 18, 2024

(54) QUESTION-ANSWERING LEARNING METHOD AND QUESTION-ANSWERING LEARNING SYSTEM USING THE SAME AND COMPUTER PROGRAM PRODUCT THEREOF

(71) Applicant: INDUSTRIAL TECHNOLOGY RESEARCH INSTITUTE, Hsinchu (TW)

(72) Inventors: Min-Hsin Shen, Taichung (TW); Yao-Chung Fan, Kaohsiung (TW); Hui-Lan Hung, Changhua (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1051 days.

(21) Appl. No.: 16/728,377

(22) Filed: Dec. 27, 2019

(65) Prior Publication Data

US 2021/0201172 A1 Jul. 1, 2021

(51) Int. Cl.
*G06N 5/04* (2023.01)
*G06F 16/23* (2019.01)
(Continued)

(52) U.S. Cl.
CPC ........... *G06N 5/04* (2013.01); *G06F 16/2365* (2019.01); *G06F 16/3329* (2019.01);
(Continued)

(58) Field of Classification Search
CPC ............ G06N 5/04; G06N 20/00; G06N 5/02; G06N 5/025
See application file for complete search history.

(56) References Cited

U.S. PATENT DOCUMENTS

| 7,292,976 B1 | 11/2007 | Hakkani-Tur et al. |
| 7,603,330 B2 | 10/2009 | Gupta et al. |

(Continued)

FOREIGN PATENT DOCUMENTS

| CN | 105893523 A | 8/2016 |
| CN | 104050256 B | 5/2017 |

(Continued)

OTHER PUBLICATIONS

Bakis, Raimo, et al. "Performance of natural language classifiers in a question-answering system." IBM Journal of Research and Development 61.4/5 (2017): 14-1. (Year: 2017).*

(Continued)

*Primary Examiner* — Kevin W Figueroa
(74) *Attorney, Agent, or Firm* — Birch, Stewart, Kolasch & Birch, LLP (57) ABSTRACT

A question-answering learning method including the following steps is provided. Firstly, several classifiers are created according to N1 labeled sentences among N sentences. Then, at least one corresponding sentence type of each of the N2 unlabeled sentences among the N sentences is determined by each classifier. Then, N3 sentences are selected from the N2 unlabeled sentences according to a degree of consistency of determined results of the classifiers, wherein the determined results of the N3 sentences are determined by the classifiers and are inconsistent. Then, N4 mutually complementary sentences are selected as to-be-labeled sentences from the N3 sentences. Then, after the N4 selected to-be-labeled sentences are labeled, several classifiers are re-created according to the N1 labeled sentences and the N4 selected to-be-labeled sentences. Then, at least one of the previously created classifiers is added to the currently created classifiers to be members of the classifiers.

17 Claims, 5 Drawing Sheets

(51) Int. Cl.
*G06F 16/33* (2019.01)
*G06F 16/332* (2019.01)
*G06F 16/35* (2019.01)
*G06N 5/02* (2023.01)
*G06N 5/025* (2023.01)
*G06N 20/00* (2019.01)

(52) U.S. Cl.
CPC ........ *G06F 16/3344* (2019.01); *G06F 16/355* (2019.01); *G06N 5/02* (2013.01); *G06N 5/025* (2013.01); *G06N 20/00* (2019.01)

(56) References Cited

U.S. PATENT DOCUMENTS

| | | |
|---|---|---|
| 2016/0292582 A1 | 10/2016 | Kozloski et al. |
| 2017/0116519 A1 | 4/2017 | Johnson et al. |
| 2018/0240031 A1 | 8/2018 | Huszar et al. |
| 2019/0005018 A1 | 1/2019 | Sharma et al. |
| 2019/0130900 A1 | 5/2019 | Tsai et al. |
| 2019/0180195 A1 | 6/2019 | Terry et al. |
| 2019/0180196 A1 | 6/2019 | Terry et al. |
| 2021/0157845 A1* | 5/2021 | Dodel ............... G06N 3/08 |

FOREIGN PATENT DOCUMENTS

| | | |
|---|---|---|
| CN | 106855873 A | 6/2017 |
| CN | 109101537 A | 12/2018 |
| CN | 110019703 A | 7/2019 |
| CN | 110111886 A | 8/2019 |
| CN | 110245227 A | 9/2019 |
| CN | 110321418 A | 10/2019 |
| CN | 110399467 A | 11/2019 |
| JP | 2001-51582 A | 2/2001 |
| TW | M574723 | 2/2019 |
| WO | WO2014/008272 A1 | 1/2014 |
| WO | WO 2017/010652 A1 | 1/2017 |

OTHER PUBLICATIONS

Taiwanese Office Action and Search Report for Taiwanese Application No. 108148096, dated Feb. 20, 2021.
An et al., "Deep Active Learning for Text Classification," ICVISP 2018, Aug. 27-29, 2018, 7 pages.
Author Unknown, "fastText," Wikipedia: The free encyclopedia, URL:https://en.wikipedia.org/w/index.php?title-FastText&oldid-933668892, 2 pages.
Brinker, "Incorporating Diversity in Active Learning with Support Vector Machines," Proceedings of the Twentieth International Conference on Machine Learning (ICML—2003), Washington DC, 2003, 8 pages.
Mishra et al., "A survey on question answering systems with classification," Journal of King Saud University—Computer and Information Sciences, 2016 (published online Nov. 2, 2015), pp. 345-361.
Ramirez-Loaiza et al., "Active Learning: an Empirical Study of Common Baselines," Data Min Knowl Disc, 2016, pp. 1-27.
Settles, "Active Learning Literature Survey," Computer Sciences Technical Report 1648, Univeristy of Wisconsin-Madison, Jan. 26, 2020, 67 pages.
Zhu et al., "Confidence-Based Stopping Criteria for Active Learning for Data Annotation," ACM Transactions on Speech and Language Processing, vol. 6, No. 3, Article 3, Apr. 2010, 24 pages.
Lihua et al., "A review of research on question classification in automatic question answering systems," Baidu Library, vol. 372, Jan. 15, 2015, pp. 1-2.

* cited by examiner

QUESTION-ANSWERING LEARNING METHOD AND QUESTION-ANSWERING LEARNING SYSTEM USING THE SAME AND COMPUTER PROGRAM PRODUCT THEREOF

TECHNICAL FIELD

The disclosure relates to a question-answering learning method and a question-answering learning system using the same.

BACKGROUND

Conventional question-answering learning methods establish question-answering models according to a large volume of manually-classified sentences. Question-answering systems are also referred as automatic question-answering systems, dialogue systems, conversation systems, automatic customer service systems, customer service robots, text interactive assistants, or instant message robots. In the follow-up question-answering learning processes, for new incoming sentences that are falsely classified by the learned question-answering models, correct labels are obtained by human labeling (corresponding answers are provided to new sentences). Although involving large amount of manual processing, conventional methods cannot ensure the resulting question-answering accuracies are consistently increased.

Therefore, how to reduce the manual processing labor and stably increase the question-answering accuracy has become a prominent task for the industries.

SUMMARY

According to one embodiment of the present disclosure, a question-answering learning method is provided. The question-answering learning method includes the following. A classifier module is created by a classifier generation module according to N1 labeled sentences among N sentences, wherein the classifier module includes several classifiers each representing different question-answering models, and both of the N and the N1 are positive integers. At least one corresponding sentence type of each of the N2 unlabeled sentences among the N sentences is determined by each of the classifiers, wherein the N2 is a positive integer. In a consistency evaluation process, N3 sentences are selected from the N2 unlabeled sentences by a consistency evaluation module according to a degree of consistency of determined results of the classifiers, wherein the determined results of the N3 sentences are determined by the classifiers and are inconsistent, and the N3 is a positive integer. In a complementarity evaluation process, N4 mutually complementary sentences are selected as to-be-labeled sentences from the N3 sentences by a complementarity evaluation module, wherein the N4 is a positive integer. After the N4 selected to-be-labeled sentences are labeled, the classifiers of the classifier module are re-created by the classifier generation module according to the N1 labeled sentences and the N4 selected to-be-labeled sentences. At least one of previously created classifiers is added to the classifier module to be members of the classifier module by a classifier evaluation module.

According to another embodiment of the present disclosure, a question-answering learning system is provided. The question-answering learning system includes a classifier generation module, a consistency evaluation module, a complementarity evaluation module and a classifier evaluation module. The classifier generation module is configured to: create a classifier module according to N1 labeled sentences among N sentences, wherein the classifier module includes several classifiers each representing different question-answering models, and both of the N and the N1 are positive integers. Each of the classifiers determines at least one corresponding sentence type of each of the N2 unlabeled sentences among the N sentences, wherein the N2 is a positive integer. The consistency evaluation module is configured to: select, in a consistency evaluation process, N3 sentences from the N2 unlabeled sentences according to a degree of consistency of determined results of the classifiers, wherein the determined results of the N3 sentences are determined by the classifiers and are inconsistent, and the N3 is a positive integer. The complementarity evaluation module is configured to: select, in a complementarity evaluation process, N4 mutually complementary sentences as to-be-labeled sentences from the N3 sentences, wherein the N4 is a positive integer. The classifier generation module is further configured to: re-create, after the N4 selected to-be-labeled sentences are labeled, the classifiers of the classifier module according to the N1 labeled sentences and the N4 selected to-be-labeled sentences. The classifier evaluation module is configured to: add at least one of previously created classifiers to the classifier module to be members of the classifier module.

According to an alternate embodiment of the present disclosure, a computer programming product is disclosed. The computer program product is installed in a question-answering learning system to execute a question-answering learning method. The question-answering learning method includes the following: A classifier module is created by a classifier generation module according to N1 labeled sentences among N sentences, wherein the classifier module includes several classifiers each representing different question-answering models, and both of the N and the N1 are positive integers. At least one corresponding sentence type of each of the N2 unlabeled sentences among the N sentences is determined by each of the classifiers, wherein the N2 is a positive integer. In a consistency evaluation process, N3 sentences are selected from the N2 unlabeled sentences by a consistency evaluation module according to a degree of consistency of determined results of the classifiers, wherein the determined results of the N3 sentences are determined by the classifiers and are inconsistent, and the N3 is a positive integer. In a complementarity evaluation process, N4 mutually complementary sentences are selected as to-be-labeled sentences from the N3 sentences by a complementarity evaluation module, wherein the words or textual meanings of the N4 sentences are not mutually repetitive, similar, implicative or derivative, and the N4 is a positive integer. After the N4 selected to-be-labeled sentences are labeled, the classifiers of the classifier module are re-created by the classifier generation module according to the N1 labeled sentences and the N4 selected to-be-labeled sentences. At least one of previously created classifiers is added to the classifier module to be members of the classifier module by a classifier evaluation module.

The above and other aspects of the invention will become better understood with regards to the following detailed description of the preferred but non-limiting embodiment (s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
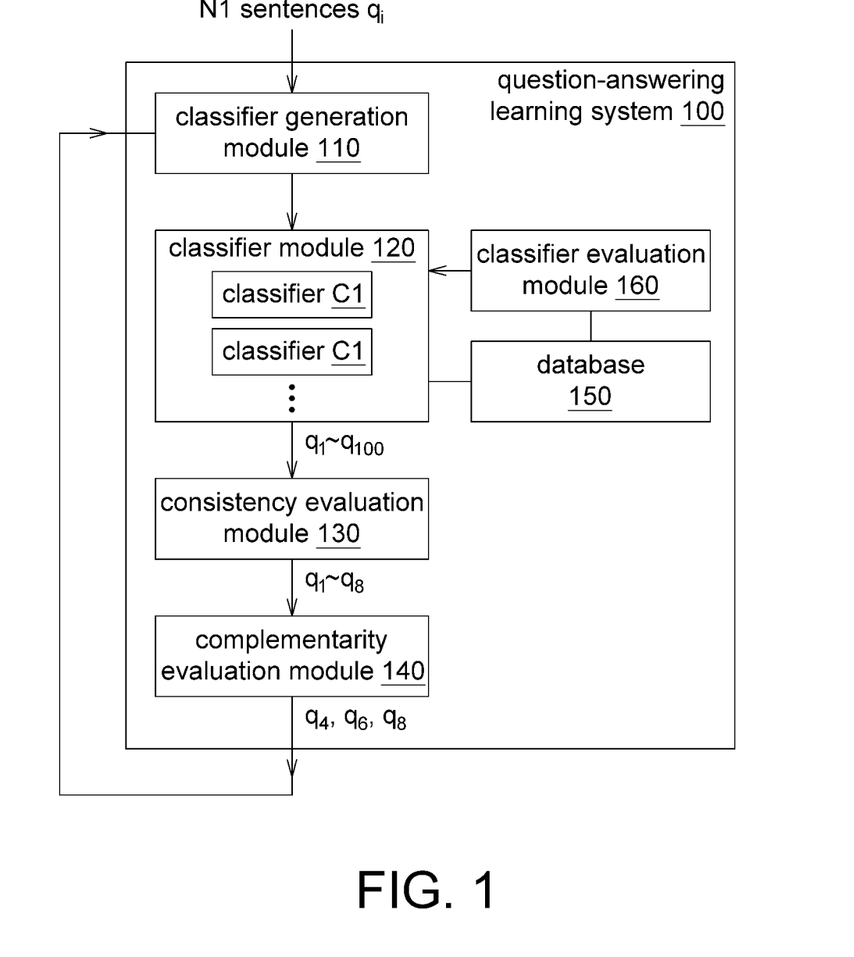
FIG. 1 is a functional block diagram of a question-answering learning system according to an embodiment of the present disclosure.

Referring to FIG. 1, a functional block diagram of a question-answering learning system 100 according to an embodiment of the present disclosure is shown. The question-answering learning system 100 includes a classifier generation module 110, a classifier module 120, a consistency evaluation module 130, a complementarity evaluation module 140, a database 150 and a classifier evaluation module 160.

At least one of the classifier generation module 110, the classifier module 120, the consistency evaluation module 130, the complementarity evaluation module 140 and the classifier evaluation module 160 could be realized by one or more than one of a chip formed by a semiconductor manufacturing process, a circuit, a circuit board and a recording medium storing several programming codes. At least two of the classifier generation module 110, the classifier module 120, the consistency evaluation module 130, the complementarity evaluation module 140 and the classifier evaluation module 160 could be integrated as a single module. Or, at least one of the classifier generation module 110, the classifier module 120, the consistency evaluation module 130, the complementarity evaluation module 140 and the classifier evaluation module 160 could be integrated to a processor or a controller. Besides, the database 150 could be stored in a storage module, such as a memory.

Figure 5:
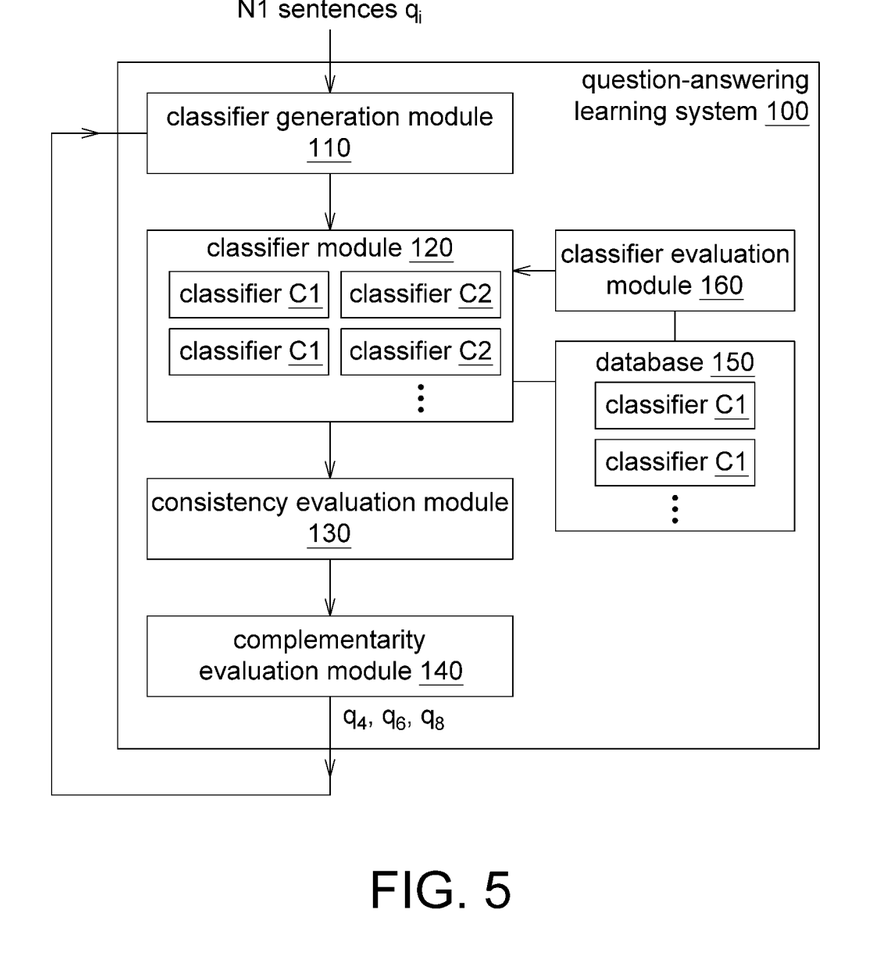
FIG. 5 is a schematic diagram of the re-creation of the classifiers of the question-answering learning system 100 of FIG. 1.

The classifier generation module 110 creates a classifier module 120 according to N1 labeled sentences of N sentences, wherein the classifier module 120 includes several classifiers C1 each representing different question-answering models, and both of the N and the N1 are positive integers. Each classifier is configured to determine at least one corresponding sentence type of each of the N2 unlabeled sentences among the N sentences, wherein the N2 is a positive integer. The consistency evaluation module 130 is configured to select, in a consistency evaluation process, N3 sentences from the N2 unlabeled sentences according to a degree of consistency of determined results of the classifiers C1, wherein the determined results of the N3 sentences are determined by the classifiers C1 and are inconsistent, wherein the N3 is a positive integer. The complementarity evaluation module 140 is configured to select, in a complementarity evaluation process, N4 mutually complementary sentences as to-be-labeled sentences from the N3 sentences, wherein the N4 is a positive integer, and the words or textual meanings of the N4 sentences are not mutually repetitive, similar, implicative or derivative. After the N4 selected to-be-labeled sentences are labeled, the classifier generation module 110 re-creates the classifier evaluation module 160 of several classifiers C2 (the classifiers C2 are illustrated in FIG. 5 of the classifier module 120 according to the N1 labeled sentences and the N4 selected to-be-labeled sentences, and adds at least one of the previously created classifiers C1 to the classifier module 120 to be members of the classifier module 120. In an embodiment, N1 is less than N, N2 is less than N, N3 is not greater than N2 and N4 is not greater than N3, but the embodiment of the present disclosure is not limited thereto. Moreover, the "sentences" of the present specification are such as natural language description sentences, natural language question sentences or oral sentences, oral question sentences, direct sentences or other sentences with any grammar forms or sentence patterns.

Furthermore, the classifier generation module 110 could perform learning training using the neural network (NN) technology, the deep neural network (DNN) technology or the support vector machine technology. The question-answering learning system 100 could actively select a small volume of sentences from the unlabeled sentences to be manually labeled. Then, the manually labeled sentences are fed to the classifier generation module 110 for re-training purpose. The classifier generation module 110 creates at least one classifier C2 according to the manually labeled results. In other words, the question-answering learning method of the question-answering learning system 100 is an active machine learning method.

Instead of labeling a large volume of N sentences, the question-answering learning system 100 of the embodiment of the present disclosure only selects N4 sentences to be manually labeled (that is, e.g., associating those sentences with corresponding responses, such as answering sentences, answers, function menus, patterns and/or pictures), wherein the value of N4 is less than the value of N, such that the manual labeling labor could be greatly saved. Furthermore, since the N4 sentences selected by the question-answering learning system 100 are lowly consistent but highly complementary with respect to the existing labeled sentences, the probability of repeat manual-labeling of the sentences of the same sentence types could be reduced, and the overall question-answering accuracy of the question-answering learning system 100 could be stably increased. After the retraining, members of the classifier module further add in at least one of the classifiers created prior to the retraining. Therefore, during the iterative update process, the question-answering accuracy could be stably increased, system efficiency is less likely to be affected by the update process, and the management convenience of the question-answering system is increased.

In an example, the value of N is such as 10000, N1 is such as 100, N2 is such as 9900 (N−N1=9900), N3 is such as 8, and N4 is such as 3. In the present example, only 3 (that is, the value of N4) sentences need to be manually labeled. The labeling of the 3 sentences, which are lowly consistent but highly complementary with the previously labeled sentences, is meaningful and could increase the overall question-answering accuracy of the question-answering learning system 100. Besides, the values of N, N1, N2, N3 and N4 exemplified above are not subjected to specific restrictions in the embodiment of the present disclosure, and could be larger or smaller than the values exemplified above.

Figure 2:
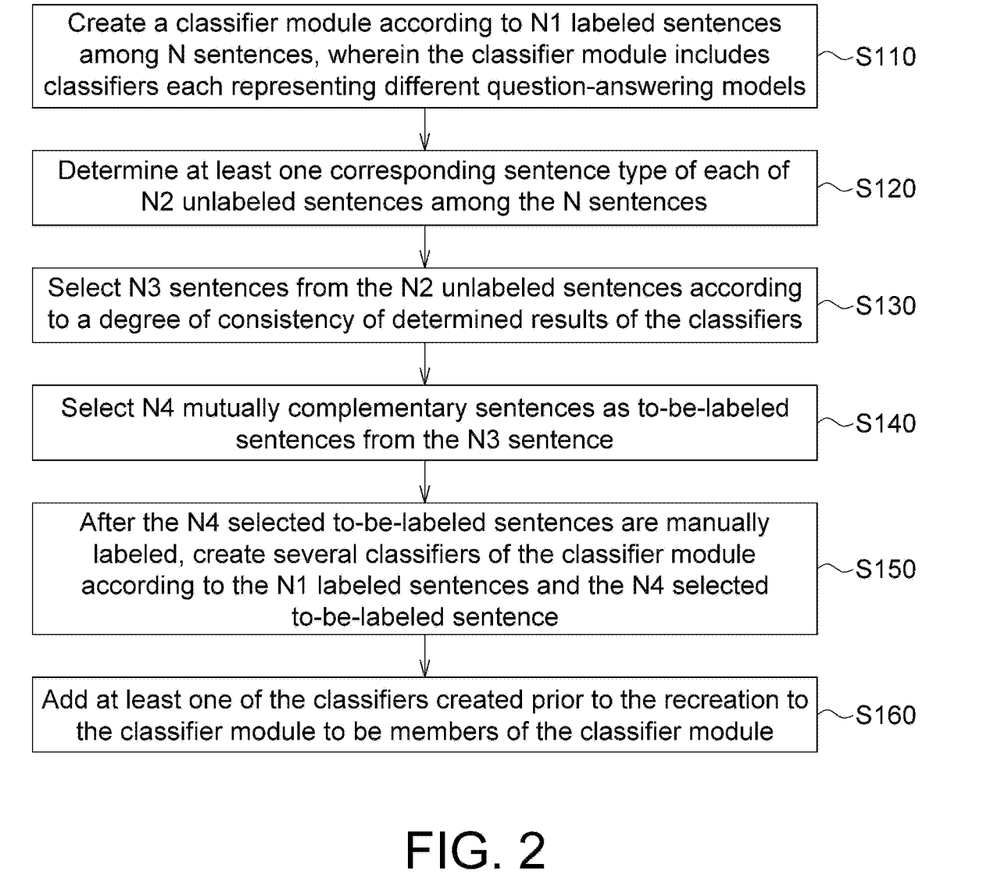
FIG. 2 is a flowchart of a question-answering learning method of the question-answering learning system of FIG. 1.

The process of selecting N4 sentences by the question-answering learning system 100 is disclosed below. Referring to FIG. 2, a flowchart of a question-answering learning method of the question-answering learning system 100 of FIG. 1 is shown.

In the S110, a classifier module 120 is created by the classifier generation module 110 according to N1 labeled sentences among N sentences, wherein the classifier module 120 includes classifiers C1 each representing different question-answering models, both N and N1 are positive integers, and N1 is less than N. Instead of labeling the N sentences one by one, the active learning question-answering method of the embodiment of the present disclosure only needs to select even fewer sentences (that is, N4 sentences) from N1 meaningful sentences, such that the question-answering accuracy could be increased.

In the S120, at least one corresponding sentence type of each of the N2 unlabeled sentences among the N sentences is determined by each of the classifiers C1, wherein N2 is a positive integer and N2 is less than N.

Let N2 be 100. At least one corresponding sentence type of each of the N2 unlabeled sentence $q_1$ to $q_{100}$ is determined by each of the classifiers C1. Let sentence $q_1$ be taken for example. At least one corresponding sentence type of the sentence $q_1$ is determined by each of the classifiers C1. If all classifiers C1 unanimously determine that the sentence $q_1$ belongs to the same sentence types, then the sentence $q_1$ is defined to be consistent (or completely consistent). If the classifiers C1 do not unanimously determine that the sentence $q_1$ belongs to the same sentence types, then the sentence $q_1$ is defined to be inconsistent (that is, inconsistent)

In the S130, in the consistency evaluation process, N3 sentences are selected from the N2 unlabeled sentences by the consistency evaluation module 130 according to a degree of consistency of determined results of the classifiers C1, wherein the determined results of the N3 sentences are determined by the classifiers C1 and are inconsistent, and N3 is a positive integer not greater than N2. For a sentence, the larger the number of sentence types determined by the classifiers C1, the higher the degree of inconsistency (or lowly consistent). Conversely, for a sentence, the smaller the number of sentence types determined by the classifiers C1, the lower the degree of inconsistency (or highly consistent).

In the following descriptions of the present embodiment, it is exemplified that 8 sentence $q_1$ to $q_8$ of the N3 unlabeled sentence $q_1$ to $q_{100}$ are inconsistent.

In the S140, in the complementarity evaluation process, N4 mutually complementary sentences are selected as to-be-labeled sentences from the N3 sentence $q_1$ to $q_8$ by the complementarity evaluation module 140, wherein N4 is a positive integer not greater than N3. Depending on the degrees of complementarity between N3 sentence $q_1$ to $q_8$, the number of the N4 selected to-be-labeled sentences may be equivalent to or less than N3.

Figure 3:
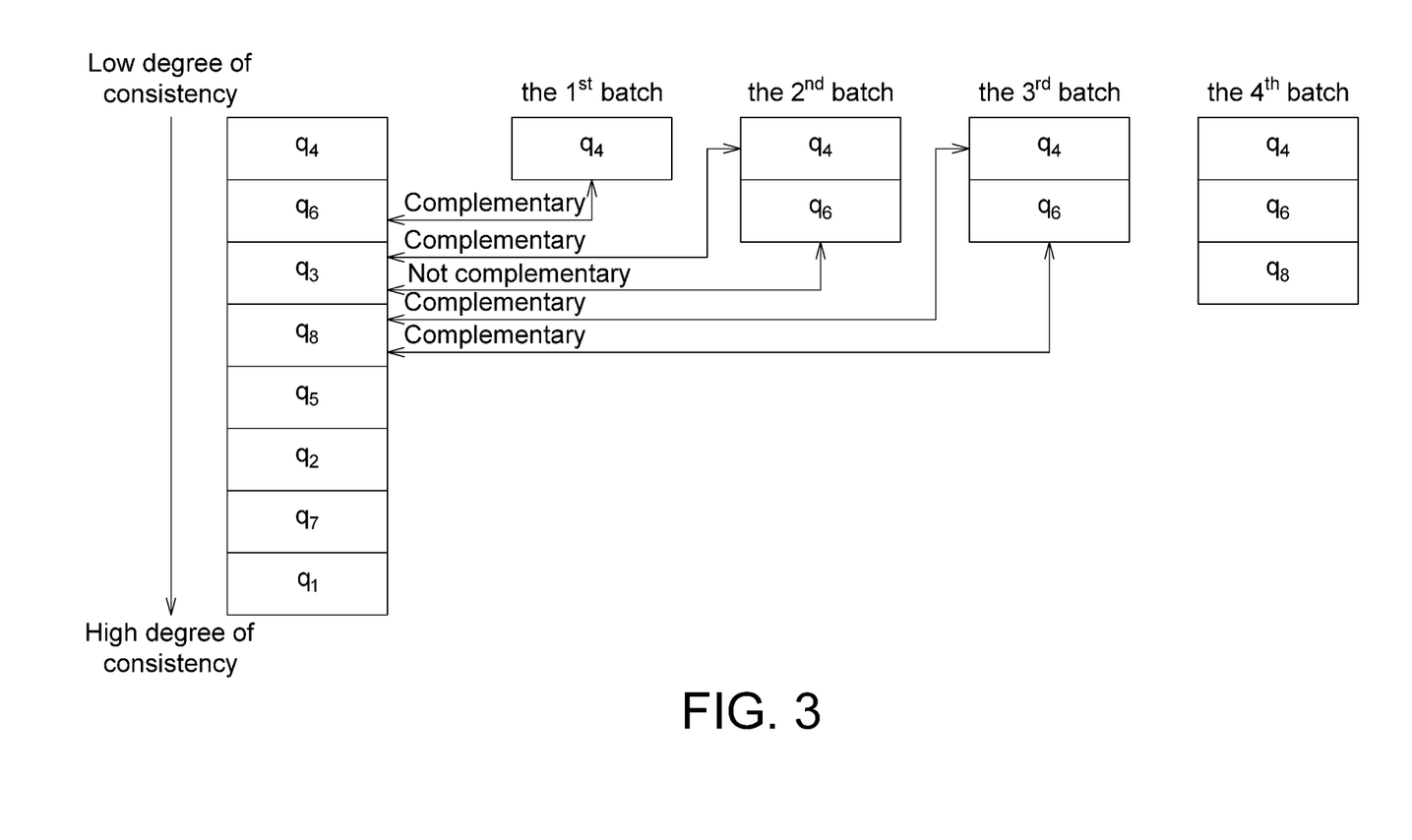
FIG. 3 is a schematic diagram of the determination of sentence complementarity according to an embodiment of the present disclosure.
Figure 4:
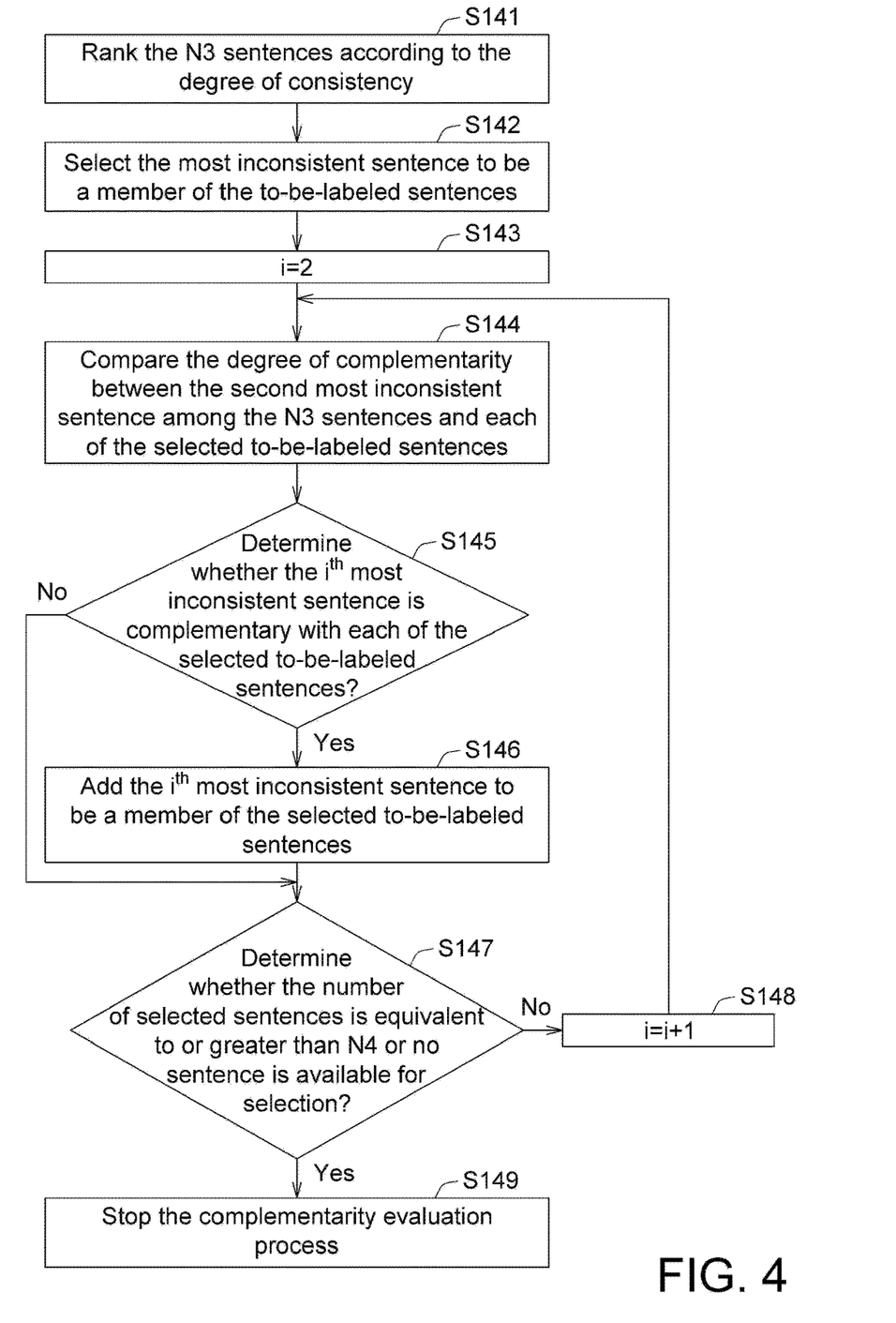
FIG. 4 is a flowchart of the determination of sentence complementarity according to an embodiment of the present disclosure.

Refer to FIG. 3 and FIG. 4. FIG. 3 is a schematic diagram of the determination of sentence complementarity according to an embodiment of the present disclosure. FIG. 4 is a flowchart of the determination of sentence complementarity according to an embodiment of the present disclosure.

In the S141, the N3 sentences could be ranked by the complementarity evaluation module 140 according to the degrees of consistency. As indicated in FIG. 3, the complementarity evaluation module 140 ranks the sentences as $q_4$, $q_6$, $q_3$, $q_8$, $q_5$, $q_2$, $q_7$ and $q_1$ in an ascending order according to the degree of consistency.

Then, in the S142, as indicated in FIG. 3, in the 1st batch of selection, the most inconsistent sentence $q_4$ is selected to be a member of the to-be-labeled sentences by the complementarity evaluation module 140.

Then, in the S143, the initial value of i is set to be equivalent to 2 by the complementarity evaluation module 140.

Then, in the S144, in the 2nd batch of selection, the complementarity evaluation module 140 compares the degrees of complementarity between the second most inconsistent sentence among the N3 sentences and each of the selected to-be-labeled sentences. For example, the complementarity evaluation module 140 compares the degrees of complementarity between the $i^{th}$ (the $i^{th}$ most inconsistent) sentence $q_6$ and the selected to-be-labeled sentence $q_4$.

Then, in the S145, whether the second most inconsistent (such as the $i^{th}$ most inconsistent) sentence is complementary with each of the selected to-be-labeled sentences is determined by the complementarity evaluation module 140. For example, the complementarity evaluation module 140 determines whether the sentence $q_6$ is complementary with the selected to-be-labeled sentence $q_4$. If it is determined that the sentence $q_6$ is complementary with the selected to-be-labeled sentence $q_4$, then the method proceeds to the S146. Also, if the second most inconsistent (such as the $i^{th}$ most inconsistent) sentence is not complementary with each of the selected to-be-labeled sentences, then the complementarity evaluation module 140 does not add the second most inconsistent sentence to be a member of the selected to-be-labeled sentences. For example, if the sentence $q_6$ is not complementary with the selected to-be-labeled sentence $q_4$, then the complementarity evaluation module 140 does not add the sentence $q_6$ to be a member of the selected to-be-labeled sentences, the sentence $q_6$ could be ignored and the method proceeds to the S147.

In the S146, if the second most inconsistent (such as the $i^{th}$ most inconsistent) sentence is complementary with each of the selected to-be-labeled sentences, then the second most inconsistent sentence is added to be a member of the selected to-be-labeled sentences by the complementarity evaluation module 140. As indicated in FIG. 3, if the sentence $q_6$ is complementary with the selected to-be-labeled sentence $q_4$, then the complementarity evaluation module 140 selects the sentence $q_6$ to-be-labeled.

Then, in the S147, whether the number of selected sentences is equivalent to or greater than N4 or no sentence is available for selection (for example, i is equivalent to N3) is determined by the complementarity evaluation module 140. If it is determined that the number of selected sentences is equivalent to or greater than N4, then the method proceeds to the S149. If it is determined that the number of selected sentences is less than N4 or i is not equivalent to N3, then the method proceeds to the S148, the value of i is accumulated and the method returns to the S144 to determine the degree of complementarity of the next sentence.

As indicated in FIG. 3, in the 2nd batch of selection, the number of the selected to-be-labeled sentences is 2, being less than N4 (such as 3), therefore the complementarity evaluation of the next sentence proceeds. For example, after the value of i is accumulated (i=3), the complementarity evaluation module 140 compares the degree of complementarity between the $i^{th}$ (such as the $3^{rd}$ most inconsistent) sentence $q_3$ and each of the selected to-be-labeled sentences $q_4$ and $q_6$. As indicated in the diagram, the sentence $q_3$ is complementary with the selected to-be-labeled sentence $q_4$, but the sentence $q_3$ is not complementary with another selected to-be-labeled sentence $q_6$, therefore the complementarity evaluation module 140 ignores (or gives up) the sentence $q_3$ and does not add the sentence $q_3$ to be a member of the selected to-be-labeled sentences.

As indicated in FIG. 3, in the 3rd batch of selection, the number of the selected to-be-labeled sentences is still 2, being less than N4 (N4 is such as 3), therefore the complementarity evaluation of the next sentence proceeds. For example, after the value of i is accumulated (i=4), the complementarity evaluation module 140 compares the degree of complementarity between the $i^{th}$ (such as the 4th most inconsistent) sentence $q_8$ and each of the selected to-be-labeled sentences $q_4$ and $q_6$. As indicated in the diagram, the sentence $q_8$ is complementary with each of the selected to-be-labeled sentences $q_4$ and $q_6$, therefore the complementarity evaluation module 140 selects the sentence $q_8$ to-be-labeled.

As indicated in FIG. 3, in the 4th batch of selection, the number of the selected to-be-labeled sentences is already equivalent to or greater than N4 (N4 is such as 3) or no sentence is available for selection, therefore the method proceeds to the S149 to stop the complementarity evaluation process. Then, only the selected sentences need to be manually labeled. In comparison to the larger numbers, such as N, N1, N2 and N3, only a relatively smaller number of selected sentences such as N4 need to be manually labeled, therefore a large volume of processing time could be saved. Moreover, since the selected sentences are highly complementary (or complementary) but lowly consistent (or inconsistent) with previously labeled sentences, the question-answering accuracy could be effectively increased when the selected sentences are added to the question-answering learning system 100.

The method for determining whether two sentences are mutually complementary is disclosed below.

When two sentences are complementary, this indicates that the information content between the two sentences is not repeated, that is, the words and/or textual meanings between the two sentences are not mutually repetitive, similar, implicative and/or derivative. According to the adopted text analytic approaches, the degree of repetition of information content between the two sentences could be represented by a binary value (0 represents not implied, 1 represents implied), a ratio value or a probability value. For example, textual entailment approaches could be adopted to identify the logical inference between the two sentences $q_1$ and $q_2$. If the complete meaning of the sentence $q_2$ could be inferred from the sentence $q_1$ (that is, the sentence $q_1$ semantically entails the sentence $q_2$), this indicates that the information content of the sentence $q_1$ already includes the information content of the sentence $q_2$, and the two sentences $q_1$ and $q_2$ are mutually complementary; otherwise, the two sentences $q_1$ and $q_2$ are not mutually complementary. Besides, the repeated information content between the two sentences could be measured using repeated words. If the words of the sentence $q_1$ are repeated in the sentence $q_2$ at a high percentage (such as 60%, but the embodiment of the present application is not limited thereto), this indicates that the two sentence $q_1$ and $q_2$ have a large volume of repeated information content and a low degree of complementarity (such as 40%, but the embodiment of the present application is not limited thereto). Also, word repetition analysis could further be expanded using synonyms, antonyms, related words, similar words, semantic word network, ontology word graph, named-entity recognition, or word embedding. That is, the higher the semantic similarity between the sentences $q_1$ and sentence $q_2$, the lower the degree of complementarity between the two sentence $q_1$ and $q_2$. Or, the repeated information content between the two sentences could be measured using language models. The higher the probability of deriving the sentence $q_2$ by the language model of the sentence $q_1$ (such as 60%, but the embodiment of the present application is not limited thereto), the larger the volume of repeated information content between the two sentence $q_1$ and $q_2$, and the lower the degree of complementarity between the two sentence $q_1$ and $q_2$ (such as 40%, but the embodiment of the present application is not limited thereto)

Let the sentence $q_1$ be "The Empire State Building has a subway station." and the sentence $q_2$ be "Get to the Empire State Building by public transport." The sentence $q_1$ implicates the sentence $q_2$, and the recognition result of textual entailment could be represented by a binary value "1" indicating the entailment (information content is repeated, i.e., not complementary) or a probability of such as 90% indicating that the entailment relation is highly likely (information content is highly repeated, i.e., low degree of complementary).

To summarize, the degree of complementarity between two sentences could be determined according to one of the following conditions or a combination thereof: (1) the degree of repetition of words, synonyms, or the degree of repetition of synonyms or antonyms or related words, the degree of repetition of related word network of words, the similarity of the textual meaning of words, the similarity of the upper and the lower ontology concepts of words, the similarity of related words, and the graph similarity of the related word network between the two sentences; (2) the degree of repetition of phrases, clauses or named-entities between the two sentences; (3) the similarity of phrases, clauses or named-entities between the two sentences; (4) the similarity of word embedding vectors between the two sentences; (5) the similarity of sentence patterns between the two sentences; (6) the degree of semantic similarity between the two sentences; (7) the relations of textual entailment between the two sentences; (8) the probability of textual entailment between the two sentences; (9) the similarity of language model between the two sentences.

In an embodiment, the complementarity evaluation module 140 could determine the degree of complementarity between the two sentences according to the words of the same concept (or synonyms) and the sentence pattern used in the sentences. Suppose the two sentences respectively are: "How to get to New York" and "How to get to the Empire State". Since "New York" and "the Empire State" belongs to the same concept (or synonyms) and the two sentences have the same sentence pattern, the complementarity evaluation module 140 determines that the two sentences are not complementary (low degree of complementarity). In another example, suppose the two sentences respectively are "How to get to New York" and "What activities are there in New York?". Since the two sentences have different sentence patterns, the complementarity evaluation module 140 determines that the two sentences are complementary (high degree of complementarity). To summarize, the complementarity evaluation module 140 determines the degree of complementarity between the two sentences using the sentence semantics analysis technology.

Then, in the S150 of FIG. 2, refer to FIG. 5 at the same time. FIG. 5 is a schematic diagram of the re-creation of the classifiers of the question-answering learning system 100 of FIG. 1. In the S150, after the N4 selected to-be-labeled sentences are manually labeled, several classifiers C2 of the classifier module 120 are re-created by the classifier generation module 110 according to the N1 labeled sentences and the N4 selected to-be-labeled sentences. Furthermore, the classifier generation module 110 could pre-store the classifiers C1 of the previous iteration (the process of re-creating a batch of classifiers is referred as an iteration) in the database 150.

Then, in the S160, as indicated in FIG. 5, at least one of the classifiers C1 created prior to the recreation is added to the classifier module 120 to be members of the classifier module 120 by the classifier evaluation module 160. In other words, the classifier evaluation module 160 could add at least one of the classifiers C1 generated in the previous iteration to the classifiers C2 generated in the current iteration to be members of the classifiers of the classifier module 120. Since each classifier represents different question-answering models, by adding the classifiers C1 generated in the previous iteration to the classifier module 120, the influence of the newly selected sentences on the question-answering accuracy could be reduced to the range not covered by the classifiers C1. Therefore, the instability or decrease in the question-answering accuracy caused by the updated classifiers could be reduced, and the question-answering accuracy of the question-answering learning system 100 could be stably increased.

Several embodiments of adding at least one classifier C1 generated in the previous iteration to the classifier evaluation module 160 are disclosed below. The classifier evaluation module 160 reserve classifiers according to the classification accuracy of the classifiers C1, the number of iterations, the decay rate of iterations, the upper or the lower limit of the members of the classifier module, the reservation of all classifiers of each iteration, or the combinations of the above conditions.

For example, in an embodiment, the classifier evaluation module 160 determines the members of the classifier module 120 by: keeping all classifiers C1 generated in all previous iterations. Suppose the classifier module has 4 classifiers generated in the 1st iteration. Then, the classifier module has 8 classifiers generated in the $2^{nd}$ iteration, wherein 4 classifiers are the total classifiers generated in the 1st iteration; and the classifier module has 12 classifiers generated in the $3^{rd}$ iteration, wherein 4 classifiers are the total classifiers generated in the 1st iteration, and the other 4 classifiers are the classifiers generated in the $2^{nd}$ iteration.

In another embodiment, the classifier evaluation module 160 determines the members of the classifier module 120 by: keeping only all classifiers C1 generated in the previous one iteration. Suppose the classifier module has 4 classifiers generated in the 1st iteration. Then, the classifier module has 8 classifiers generated in the $2^{nd}$ iteration, wherein 4 classifiers are the total classifiers generated in the 1st iteration; and the classifier module still has 8 classifiers generated in the $3^{rd}$ iteration, wherein 4 classifiers are the classifiers generated in the $2^{nd}$ iteration.

In other embodiments, the classifier evaluation module 160 determines the members of the classifier module 120 by: keeping only n classifiers C1 generated in the previous iteration with topmost classification accuracies, wherein n is between 1% to 50% of the classifiers generated in the previous iteration; or, n is a positive integer ranging from 1 to the number of classifiers generated in the previous iteration. Suppose the classifier module has 4 classifiers generated in the 1st iteration. Then, the classifier module has 6 classifiers generated in the 2nd iteration, wherein the 2 added classifiers have topmost classification accuracies among the 4 classifiers generated in the 1st iteration.

To summarize, according to the question-answering learning method of the embodiment of the present disclosure, only a relatively smaller number of selected to-be-labeled sentences need to be manually labeled, therefore a large volume of processing time could be saved. Besides, since each iteration could keep the classifiers generated in previous iteration, the selected to-be-labeled sentences have a higher degree of complementarity (or complementary) but a lower degree of consistency (or inconsistent) than other labeled sentences. Therefore, after the sentences selected in each iteration are added to the question-answering learning system, the question-answering accuracy could be stably increased.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A question-answering learning method, comprising:
   creating a classifier module by a classifier generation module according to N1 labeled sentences among N sentences, wherein the N sentences comprises the N1 labeled sentences and N2 unlabeled sentences, and a classifier module comprises a plurality of classifiers each representing different question-answering models, wherein both of the N and the N1 are positive integers;
   determining at least one corresponding sentence type of each of the N2 unlabeled sentences among the N sentences by each of the classifiers, wherein the N2 is a positive integer;
   selecting, in a consistency evaluation process, N3 sentences from the N2 unlabeled sentences by a consistency evaluation module according to a degree of consistency of determined results of the classifiers, wherein the determined results of the N3 sentences are determined by the classifiers and are inconsistent, and the N3 is a positive integer;
   selecting, in a complementarity evaluation process, N4 mutually complementary sentences as to-be-labeled sentences from the N3 sentences by a complementarity evaluation module, wherein the N4 is a positive integer;
   re-creating, after the selected sentences are labeled, the classifiers of the classifier module by the classifier generation module according to the N1 labeled sentences and the selected sentences; and
   adding at least one of classifiers created prior to the recreation to the classifier module to be members of the classifier module by a classifier evaluation module;
   wherein the N4 mutually complementary sentences are unlabeled sentences, and N4 is less than N.

2. The question-answering learning method according to claim 1, further comprising:
   ranking the N3 sentences in a descending order according to the degree of consistency.

3. The question-answering learning method according to claim 1, wherein the complementarity evaluation process further comprises:
   selecting the most inconsistent sentence from the N3 sentences to be a member of the selected sentences by the complementarity evaluation module.

4. The question-answering learning method according to claim 3, wherein the complementarity evaluation process further comprises:
   comparing a degree of complementarity between a second most inconsistent sentence among the N3 sentences and each of the selected sentences by the complementarity evaluation module; and adding the second most inconsistent sentence to be a member of the selected sentences by the complementarity evaluation module if the second most inconsistent sentence is complementary with each of the selected sentences.

5. The question-answering learning method according to claim 4, wherein the complementarity evaluation process further comprises:
not adding the second most inconsistent sentence to be a member of the selected sentences by the complementarity evaluation module if the second most inconsistent sentence is not complementary with one of the selected sentences.

6. The question-answering learning method according to claim 1, wherein the complementarity evaluation process further comprises:
(a) selecting the most inconsistent sentence from the N3 sentences to be a member of the selected sentences by the complementarity evaluation module;
(b) comparing a degree of complementarity between an ith most inconsistent sentence among the N3 sentences and each of the selected sentences by the complementarity evaluation module, wherein an initial value of i is equivalent to 2;
(c) adding the ith most inconsistent sentence to be a member of the selected sentences by the complementarity evaluation module if the ith most inconsistent sentence is complementary with each of the selected sentences; and
(d) accumulating value of i and repeating the (b) to (d) if the value of i is not equivalent to N4.

7. The question-answering learning method according to claim 6, wherein the complementarity evaluation process further comprises:
determining whether number of selected sentences is equivalent to or greater than N4 by the complementarity evaluation module; and
stopping the complementarity evaluation process by the complementarity evaluation module if the number of selected sentences is equivalent to or greater than N4 or no sentence is available for selection.

8. The question-answering learning method according to claim 6, wherein the (c) further comprises:
analyzing a textual meaning of the ith most inconsistent sentence and the textual meaning of each of the selected sentences; and
adding the ith most inconsistent sentence to be a member of the selected sentences by the complementarity evaluation module if the textual meaning of the ith most inconsistent sentence is complementary with the textual meaning of one of the selected sentences.

9. A question-answering learning system, comprising:
a classifier generation module configured to create a classifier module according to N1 labeled sentences among N sentences, wherein the N sentences comprises the N1 labeled sentences and N2 unlabeled sentences, and the classifier module includes a plurality of classifiers each representing different question-answering models, and both of the N and the N1 are positive integers, and each of the classifiers is configured to determine at least one corresponding sentence type of each of the N2 unlabeled sentences among the N sentences, wherein the N2 is a positive integer;
a consistency evaluation module is configured to: select, in a consistency evaluation process, N3 sentences from the N2 unlabeled sentences according to a degree of consistency of determined results of the classifiers, wherein the determined results of the N3 sentences are determined by the classifiers and are inconsistent, and the N3 is a positive integer;
a complementarity evaluation module is configured to: select, in a complementarity evaluation process, N4 mutually complementary sentences as to-be-labeled sentences from the N3 sentences, wherein the N4 is a positive integer;
wherein the classifier generation module is further configured to: re-create, after the N4 selected to-be-labeled sentences are labeled, the classifiers of the classifier module according to the N1 labeled sentences and the N4 selected to-be-labeled sentences; and
wherein the question-answering learning system further comprises:
a classifier evaluation module configured to add at least one of classifiers created prior to the recreation to the classifier module to be members of the classifier module;
wherein the N4 mutually complementary sentences are unlabeled sentences, and N4 is less than N.

10. The question-answering learning system according to claim 9, wherein the complementarity evaluation module is further configured to:
rank the N3 sentences in a descending order according to a degree of inconsistency.

11. The question-answering learning system according to claim 9, wherein the complementarity evaluation module is further configured to:
select the most inconsistent sentence from the N3 sentences to be a member of the selected sentences.

12. The question-answering learning system according to claim 11, wherein the complementarity evaluation module is further configured to:
compare a degree of complementarity between a second most inconsistent sentence among the N3 sentences and each of the selected sentences; and
add the second most inconsistent sentence to be a member of the selected sentences if the second most inconsistent sentence is complementary with each of the selected sentences.

13. The question-answering learning system according to claim 12, wherein the complementarity evaluation module is further configured to:
not to add the second most inconsistent sentence to be a member of the selected sentences if the second most inconsistent sentence is not complementary with one of the selected sentences.

14. The question-answering learning system according to claim 9, wherein the complementarity evaluation module is further configured to:
(a) select the most inconsistent sentence from the N3 sentences to be a member of the selected sentences;
(b) compare a degree of complementarity between an ith most inconsistent sentence among the N3 sentences and each of the selected sentences, wherein an initial value of i is equivalent to 2;
(c) add the ith most inconsistent sentence to be a member of the selected sentences if the ith most inconsistent sentence is complementary with each of the selected sentences; and
(d) accumulate value of i and repeat the (b) to (d) if the value of i is not equivalent to N4.

15. The question-answering learning system according to claim 14, wherein the complementarity evaluation module is further configured to:

determine whether number of selected sentences is equivalent to or greater than N4 or no sentence is available for selection; and stop the complementarity evaluation process if the number of selected sentences is equivalent to or greater than N4.

16. The question-answering learning system according to claim 14, wherein in the (c), the complementarity evaluation module is further configured to:

analyze a textual meaning of the ith most inconsistent sentence and the textual meaning of each of the selected sentences; and add the ith most inconsistent sentence to be a member of the selected sentences by the complementarity evaluation module if the textual meaning of the ith most inconsistent sentence is complementary with the textual meaning of one of the selected sentences.

17. A non-transitory computer program product installed in a question-answering learning system to execute a question-answering learning method, wherein the question-answering learning method comprises:

creating a classifier module by a classifier generation module according to N1 labeled sentences among N sentences, wherein the N sentences comprises the N1 labeled sentences and N2 unlabeled sentences, and the classifier module comprises a plurality of classifiers each representing different question-answering models, and both N and N1 are positive integers;

determining at least one corresponding sentence type of each of the N2 unlabeled sentences among the N sentences by each of the classifiers, wherein N2 is a positive integer;

selecting, in a consistency evaluation process, N3 sentences from the N2 unlabeled sentences by a consistency evaluation module according to a degree of consistency of determined results of the classifiers, wherein the determined results of the N3 sentences are determined by the classifiers and are inconsistent, and N3 is a positive integer;

selecting, in a complementarity evaluation process, N4 mutually complementary sentences as to-be-labeled sentences from the N3 sentences by a complementarity evaluation module, wherein N4 is a positive integer;

re-creating, after the selected sentences are labeled, the classifiers of the classifier module by the classifier generation module according to the N1 labeled sentences and the selected sentences; and adding at least one of classifiers created prior to the recreation to the classifier module to be members of the classifier module by a classifier evaluation module;

wherein the N sentences comprises the N1 labeled sentences and N2 unlabeled sentences, and N4 is less than N.

* * * * *